United States Patent
Ioannidis et al.

(10) Patent No.: US 10,222,467 B2
(45) Date of Patent: Mar. 5, 2019

(54) TWO-WAY CODED APERTURE THREE-DIMENSIONAL RADAR IMAGING

(71) Applicants: George A. Ioannidis, Bel Air, MD (US); George W. Gigioli, Brookeville, MD (US)

(72) Inventors: George A. Ioannidis, Bel Air, MD (US); George W. Gigioli, Brookeville, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 625 days.

(21) Appl. No.: 14/937,394

(22) Filed: Nov. 10, 2015

(65) Prior Publication Data
US 2017/0131399 A1 May 11, 2017

(51) Int. Cl.
*H01Q 3/38* (2006.01)
*G01S 13/88* (2006.01)
(Continued)

(52) U.S. Cl.
CPC ............. *G01S 13/89* (2013.01); *G01S 7/282* (2013.01); *G01S 13/887* (2013.01); *H01Q 3/38* (2013.01); *H01Q 19/17* (2013.01); *H01Q 19/192* (2013.01)

(58) Field of Classification Search
CPC ...... G01S 13/887; G01S 13/88; G01S 13/888; H01Q 3/2658; H01Q 3/30; H01Q 3/34; H01Q 3/44; H01Q 3/46
(Continued)

(56) References Cited

U.S. PATENT DOCUMENTS

| | | | | |
|---|---|---|---|---|
| 5,341,141 A | * | 8/1994 | Frazier | G01S 7/20 342/129 |
| 6,411,255 B2 | * | 6/2002 | Roederer | H01Q 3/46 342/371 |

(Continued)

OTHER PUBLICATIONS

Li, et al.: "*MIMO Radar Signal Processing*"; found at http://samples.sainsburysebooks.co.uk/9780470391433_sample_389282.pdf on Nov. 10, 2015.

(Continued)

*Primary Examiner* — Peter M Bythrow
(74) *Attorney, Agent, or Firm* — Tarolli, Sundheim, Covell & Tummino LLP

(57) ABSTRACT

A two-way coded aperture radar imaging system is disclosed. The system includes an antenna reflector and a radar signal transceiver configured to generate sequential radar transmission signals and receive a plurality of respective reflected radar signals. The system also includes a phase control component configured to phase-encode the sequential radar transmission signals via a plurality of phase-codes to generate a respective plurality of phase-coded radar pulses that are concurrently reflected at a respective plurality of sub-aperture portions of the antenna reflector to concurrently transmit the plurality of phase-coded radar pulses from the antenna reflector to a target. The transmitted phase-coded radar pulses can be reflected from the target as the respective plurality of reflected radar signals. The system further includes a sub-aperture radar controller configured to integrate the plurality of reflected radar signals and to generate a three-dimensional image of the target from the integrated plurality of reflected radar signals.

20 Claims, 5 Drawing Sheets

(51) Int. Cl.
*G01S 13/89* (2006.01)
*G01S 7/282* (2006.01)
*H01Q 19/17* (2006.01)
*H01Q 19/19* (2006.01)

(58) Field of Classification Search
USPC .......................................................... 342/22
See application file for complete search history.

(56) References Cited

U.S. PATENT DOCUMENTS

| | | | | |
|---|---|---|---|---|
| 6,774,851 | B1* | 8/2004 | Cuhaci | H01Q 3/46 343/700 MS |
| 6,965,340 | B1* | 11/2005 | Baharav | G01S 13/89 342/175 |
| 7,042,397 | B2* | 5/2006 | Charrier | H01Q 3/46 343/700 MS |
| 7,868,829 | B1* | 1/2011 | Colburn | H01Q 3/46 343/700 MS |
| 7,932,868 | B2* | 4/2011 | Legay | H01Q 1/288 343/761 |
| 8,253,620 | B2* | 8/2012 | Wise | G01S 13/90 342/180 |
| 8,421,668 | B2* | 4/2013 | Ammar | G01S 7/412 342/176 |
| 9,151,839 | B2* | 10/2015 | Crowley | G01S 7/4026 |
| 9,843,103 | B2* | 12/2017 | Bowers | H01Q 19/10 |
| 2006/0109174 | A1* | 5/2006 | Baharav | G01S 13/04 342/179 |
| 2006/0214832 | A1* | 9/2006 | Lee | G01S 13/89 342/22 |
| 2006/0214833 | A1* | 9/2006 | Baharav | G01S 13/89 342/22 |
| 2006/0214834 | A1* | 9/2006 | Baharav | G01N 22/00 342/22 |
| 2006/0214835 | A1* | 9/2006 | Lee | G01N 22/00 342/22 |
| 2006/0214836 | A1* | 9/2006 | Baharav | G01S 13/89 342/22 |
| 2006/0273255 | A1* | 12/2006 | Volkov | G01S 7/024 250/336.1 |
| 2007/0139248 | A1* | 6/2007 | Baharav | G01S 13/89 342/22 |
| 2007/0139249 | A1* | 6/2007 | Baharav | G01S 13/89 342/22 |
| 2008/0079625 | A1* | 4/2008 | Weems | G01S 7/20 342/22 |
| 2009/0040099 | A1* | 2/2009 | Young | G01S 7/4026 342/179 |
| 2009/0103593 | A1* | 4/2009 | Bergamo | H04B 1/707 375/146 |
| 2010/0045514 | A1* | 2/2010 | Bartscher | G01S 7/03 342/25 R |
| 2011/0018756 | A1* | 1/2011 | Wise | G01S 7/03 342/25 A |
| 2011/0102235 | A1* | 5/2011 | Abdillah | G01S 7/412 342/22 |
| 2012/0093438 | A1* | 4/2012 | Abdillah | G01S 13/887 382/286 |
| 2012/0146832 | A1* | 6/2012 | Jeck | G01S 13/887 342/22 |
| 2013/0169485 | A1* | 7/2013 | Lynch | G01S 3/72 342/417 |
| 2015/0276928 | A1* | 10/2015 | Bowers | H01Q 3/24 342/368 |
| 2016/0033632 | A1* | 2/2016 | Searcy | G01S 7/03 342/153 |

OTHER PUBLICATIONS

Li, et al. 2: "*MIMO Radar with Colocated Antennas*"; Signal Processing Magazine, IEEE 24.5 (2007): 106-114.
Stoica, et al.: "*On Probing Signal Design for MIMO Radar*"; Signal Processing, IEEE Transactions on 55.8 (2007): 4151-4161.
Tabrikian: "*Barankin Bounds for Target Localization by MIMO Radars*"; Sensor Array and Multichannel Processing, 2006. Fourth IEEE Workshop on. IEEE, 2006.

* cited by examiner

TWO-WAY CODED APERTURE THREE-DIMENSIONAL RADAR IMAGING

TECHNICAL FIELD

The present invention relates generally to imaging systems, and specifically to two-way coded aperture three-dimensional radar imaging.

BACKGROUND

Ultra-high resolution imaging for concealed weapon detection at standoff ranges (e.g., 80 to 300 feet) can require high frequencies and a very large aperture to generate an extremely narrow beam to provide very fine resolution (e.g., of the order of one inch or less). Scanning of the beam across the area of interest can take time, which can be difficult when imaging a moving subject. Signal parameters, such as amplitude, time-delay, carrier-frequency, and modulation type are known to affect the performance of simple radar systems and advanced radar based imagery systems using synthetic aperture radar (SAR) techniques. In SAR systems, the motion of the platform hosting the radar transmitter can be used to synthesize a much larger antenna aperture, consequently resulting in a higher resolution in one dimension than is possible with a smaller physical aperture. A similar approach can be applied to a physical aperture by sub dividing it into multiple sub-apertures and transmitting and receiving by each sub-aperture sequentially. The two way returns received by each sub-aperture can then be processed to obtain a resolution that is twice as good as the resolution obtained by the physical aperture. However, this approach can likewise require that the target be motionless, as any movement larger than about 0.01 inches (i.e., a fraction of the wavelength at Terahertz frequencies) during the time it takes for the entire reflector to be sequentially covered by the small sub-apertures can cause defocusing.

SUMMARY

One example includes a two-way coded aperture radar imaging system. The system includes an antenna reflector and a radar signal transceiver configured to generate sequential radar transmission signals and receive a plurality of respective reflected radar signals. The system also includes a phase control component configured to phase-encode the sequential radar transmission signals via a plurality of phase-codes to generate a respective plurality of phase-coded radar pulses that are concurrently reflected at a respective plurality of sub-aperture portions of the antenna reflector to concurrently transmit the plurality of phase-coded radar pulses from the antenna reflector to a target. The transmitted plurality of phase-coded radar pulses can be reflected from the target as the respective plurality of reflected radar signals. The system further includes a sub-aperture radar controller configured to integrate the plurality of reflected radar signals and to generate a three-dimensional image of the target from the integrated plurality of reflected radar signals.

Another example includes a method for imaging a target. The method includes generating a sequence of radar transmission signals from a radar signal transceiver and generating a plurality of orthogonal phase-codes. The method also includes modulating each of the sequence of radar transmission signals with each of the plurality of orthogonal phase-codes to generate a plurality of phase-coded radar pulses. The method also includes selectively assigning each of the plurality of phase-coded radar pulses to separate respective sub-apertures associated with an antenna reflector to concurrently transmit the plurality of phase-coded radar pulses. The method also includes receiving a plurality of reflected radar signals corresponding to the respective plurality of radar phase-coded radar pulses reflected from the target. The method further includes integrating the plurality of reflected radar signals to generate integration data and generating a three-dimensional image of the target from the integration data.

Another example includes a two-way coded aperture radar imaging system. The system includes an antenna reflector and a radar signal transceiver configured to generate sequential radar transmission signals and to receive a plurality of respective reflected radar signals. The system also includes a reflectarray comprising an array of phase-shifters configured to selectively phase-encode the sequential radar transmission signals via a plurality of phase-codes and to selectively transmit a respective plurality of phase-coded radar pulses that are concurrently reflected at a respective plurality of sub-aperture portions of the antenna reflector. The plurality of sub-apertures can correspond to a selective assignment of the array of phase-shifters. The plurality of phase-coded radar pulses are concurrently transmitted from the antenna reflector to a target. The transmitted plurality of phase-coded radar pulses can be reflected from the target as the respective plurality of reflected radar signals. The system further includes a sub-aperture radar controller configured to selectively provide the plurality of phase-codes to the array of phase-shifters, to integrate the plurality of reflected radar signals, and to generate a three-dimensional image of the target from the integrated plurality of reflected radar signals.

DETAILED DESCRIPTION

Figure 1:
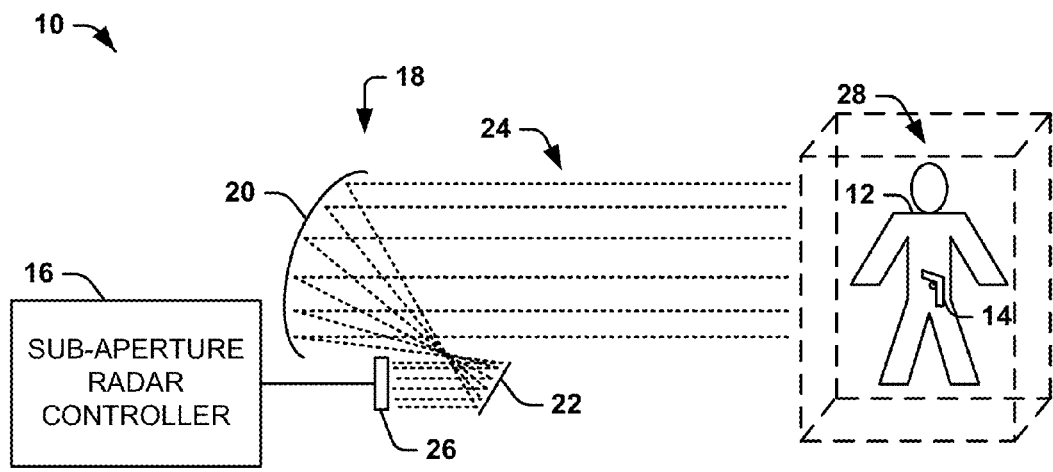
FIG. 1 illustrates an example of a two-way coded aperture radar imaging system.

The present invention relates generally to imaging systems, and specifically to two-way coded aperture three-dimensional radar imaging. Sequential pulsed radar transmission signals are generated by a radar transmitter (e.g., as part of a radar transceiver). As an example, the sequential radar transmission signals can have a frequency range in the terahertz frequency band, such that the sequential radar transmission signals can penetrate clothing. The sequential radar transmission signals are phase-encoded by the phase shifters of a sub-reflector which is subdivided into multiple sub-arrays that apply a plurality of phase-codes via a phase control component to generate a respective plurality of phase-coded radar pulses that are concurrently mapped (e.g., reflected) onto separate respective sub-apertures (e.g., sections) of a substantially parabolic antenna reflector, from which the phase-coded radar pulses are concurrently transmitted to a target (e.g., in a field of interest). The signals reflected by the target onto the reflector are reflected back into the sub-reflector by the main reflector, where the same phase-shifter settings can reapply the same phases as those used on transmit, before all returned signals are reflected into a single receive horn and corresponding receiver. Since the pulsed-signals that are reflected from targets tend to scatter in all directions, the signals reflected by the target back onto the reflector sub-apertures and corresponding sub-reflector sub-apertures originate on transmit from all sub-apertures. The function of the phase-codes is to enable recovery of the same sub-aperture transmitted signals on receive, since these are the signals required by the synthetic array processing to generate the target image. By concurrently reflecting the respective phase-coded radar pulses to different sub-apertures on the reflector, target data can be collected from different phase-centers of the respective transmission signals. As an example, the phase control component can be a reflectarray that can include an array of phase-shifters that can be individually controlled to phase-shift each of the sequential radar transmission signals with the respective phase-codes that are orthogonal with respect to each other to generate the phase-coded radar pulses. As an example, the phase-codes can each correspond to ternary (e.g., tri-phase) pseudo-random (e.g., m-sequence) code sequences to provide the orthogonality of the phase-codes with respect to the respective phase-coded radar pulses and provide that application of the same phase-code on transmit and receive does not eliminate the phase modulation (e.g., as opposed to the use of binary phase-codes).

The sequential radar transmission signals are reflected from the target and received at a receiver (e.g., as part of the radar transceiver). As an example, the signals reflected by the target are reflected back onto the respective sub-apertures of the reflect-array by the reflector and are phase encoded by the phase shifters by applying the same phase on receive to each pulse as the phase used on transmit, since, for very short range applications, there is no time to switch phase between transmit and receive. The phase encoded received signals from all reflectarray sub-apertures are then reflected into a single receiver. The use of ternary phase-codes and a corresponding phase coding scheme makes it possible to use the same phase-code on transmit and on receive and still maintain code orthogonality. The selected maximum length ternary phase-codes can be used to apply the same phase to each pulse on transmit and on receive, but can change the phase from pulse-to-pulse in a sequence of pulses and still recover the signals transmitted and received by each sub-aperture. The reflected signals can then be cross-correlated by the two way phase-codes resulting from the summation of the transmit and receive phases for each pulse to recover the two-way signals transmitted and received by each sub-aperture and to integrate the signals to form image data. Specifically, by collecting data from horizontal and vertical offsets and implementing a transform of azimuth, elevation, and range information, detailed three-dimensional images can be formed. Based on the reflection of the phase-coded radar pulses onto the respective sub-apertures of the reflector, and receipt of the reflected radar signals having the same phase-coding, the associated radar controller can integrate the received signals to generate the image data. The orthogonality of the phase-codes to generate the phase-coded radar pulses, and thus the received radar signals, allows the two-way signals transmitted and received by each sub-aperture to be separated and recovered within the radar controller with the appropriate time delays and corrections during processing. Accordingly, the radar imaging system implements synthetic two-way high-resolution beams to be formed simultaneously based on coherently combining the sub-aperture returns.

FIG. 1 illustrates an example of a two-way coded aperture radar imaging system 10. The two-way coded aperture radar imaging system 10 can be used in any of a variety of imaging applications. As an example, the two-way coded aperture radar imaging system 10 can be implemented to image a target 12, demonstrated in the example of FIG. 1 as a person. For example, the two-way coded aperture radar imaging system 10 can be implemented to determine if the target person 12 is carrying a concealed weapon, demonstrated in the example of FIG. 1 at 14, such as from an adequate standoff range. Thus, the two-way coded aperture radar imaging system 10 can be used in a variety of security systems.

The two-way coded aperture radar imaging system 10 comprises a sub-aperture radar controller 16 and a confocal radar antenna 18 that includes a main antenna reflector 20 having a substantially parabolic shape, as well as an antenna sub-reflector 22. The sub-aperture radar controller 16 can generate a sequential radar transmission signals, such as via a transceiver. As an example, the sequential radar transmission signals can have a very high frequency, such as in a terahertz frequency band, to penetrate clothing. As described in greater detail herein, each of the sequential radar transmission signals can be phase-coded via a plurality of phase-codes and transmitted as a respective plurality of phase-coded radar pulses, demonstrated at 24, from the confocal radar antenna 18 to illuminate the target 12. Specifically, the confocal radar antenna 18 can include a phase control component 26 that is configured to phase-encode the sequential radar transmission signals and to sequentially reflect each of the corresponding phase-coded radar pulses 24 onto separate respective sub-apertures of the main antenna reflector 20 via the sub-reflector 22 to illuminate the target 12. As an example, the phase-codes can each be orthogonal with respect to each other, such as based on the phase-codes being provided as ternary (e.g., tri-phase) pseudo-random number (e.g., m-sequence) code sequences, to generate the phase-coded radar pulses 24.

Each of the phase-coded radar pulses 24 can then be reflected from the target 12 and received by the sub-aperture radar controller 16 via the confocal radar antenna 18 as reflected radar signals. As a result, the received reflected radar signals can be integrated by the sub-aperture radar controller 16 to provide imaging of a field of regard (FoR) 28 of the target 12 by the two-way coded aperture radar imaging system 10. As explained in greater detail herein, the sub-aperture radar controller 16 can generate phase-codes that can modulate the sequential radar transmission signals to generate the phase-coded radar pulses 24 to illuminate the target 12 and which are received by the phase control component 26 having the same code, such that the sub-aperture radar controller 16 can provide very high three-dimensional imaging at substantially high resolution. In other words, by implementing the orthogonal ternary (e.g., tri-phase) pseudo-random number (e.g., m-sequence) code sequences to generate the phase-coded radar pulses 24, the two-way coded aperture radar imaging system 10 can enable simultaneous transmission and reception of the phase-coded radar pulses 24 at close range with the target 12, as described in greater detail herein. In addition, as also described in greater detail herein, the confocal reflector configuration of the confocal radar antenna 18 can produce an effective coded aperture of an arbitrary size.

Figure 2:
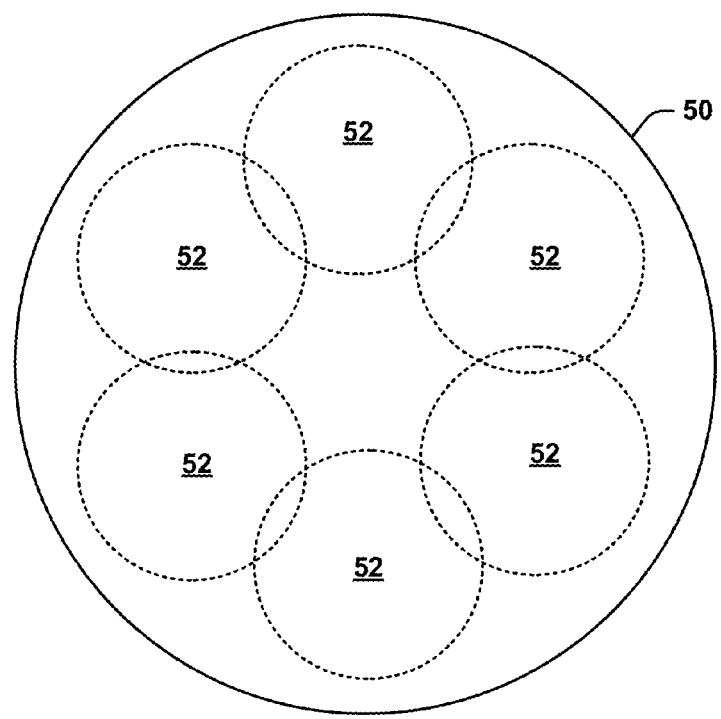
FIG. 2 illustrates an example of an antenna reflector.

FIG. 2 illustrates an example of an antenna reflector 50. The antenna reflector 50 is demonstrated as a main reflector of a confocal radar antenna, which can each be configured substantially similar to the main antenna reflector 20, in the example of FIG. 1. Therefore, reference is to be made to the example of FIG. 1 in the following description of the example of FIG. 2.

The antenna reflector 50 is demonstrated as including a plurality of sub-apertures 52 that each correspond to separate physical locations on the antenna reflector 50. The sub-apertures 52 can thus each correspond to portions of the antenna reflector 50 from which the separate respective phase-coded radar pulses 24 are concurrently reflected to be concurrently transmitted to the target 12 in the FoR 28. Thus, the phase control component 26 can phase-encode each of the sequential radar transmission signals to generate each of the phase-coded radar pulses 24, such that each of the phase-coded radar pulses 24 associated with the respective sub-apertures 52 can correspond to a given one of the sequential radar transmission signals. Thus, a plurality of distinct phase-coded radar pulses 24 can be concurrently reflected from the antenna reflector 50 toward the target 12 in the FoR 28 in a sequence corresponding to each of the sequential radar transmission signals. Similarly, the phase-coded radar pulses 24 can be reflected from the target 12 and received by the antenna reflector 50 as reflected radar signals, such that the reflected radar signals can have the same respective phase-codes as the phase-coded radar pulses 24.

As an example, the phase control component 26 can be configured as a reflectarray that is configured as an array of phase-shifters that are individually controlled by the sub-aperture radar controller 16 to provide separate respective phase-shifts to each of the respective sequential radar transmission signals corresponding to the respective phase-codes. The sub-aperture radar controller 16 can selectively assign the phase-shifters in the array to correspond to a specific one of the sub-apertures 52, and thus to provide a specific respective phase-code modulation to each of the sequential radar transmission signals. Therefore, the sub-apertures 52 correspond to physical locations on the antenna reflector 50 to which each respective one of the phase-coded radar pulses 24 are transmitted. As an example, the reflectarray can phase-encode each of the respective sequential radar transmission signals based on ternary (e.g., tri-phase) pseudo-random number (e.g., m-sequence) code sequences, such that each of the phase-codes are orthogonal with respect to each other. Therefore, based on the reflected radar pulses having the same phase-code as the respective corresponding phase-coded radar pulses 24, the sub-aperture radar controller 16 can separate and recover the respective phase-coded radar pulses 24 in the reflected radar signals to determine the time delays and characteristics of the transmitted and received phase-coded radar pulses 24.

It is to be understood that the two-way coded aperture radar imaging system 10 is not intended to be limited to the examples of FIGS. 1 and 2. As an example, although described in the implementation context of detecting a concealed weapon 14 on the target 12, the two-way coded aperture radar imaging system 10 can be implemented in any of a variety of imaging applications. As another example, the reflector 50 is not limited to the substantially parabolic circular configuration demonstrated in the example of FIG. 2, but can be configured as any of a variety of different types of reflectors. Additionally, while the example of FIG. 2 demonstrates six sub-apertures 52 that are slightly overlapping, it is to be understood that the arrangement of sub-apertures 52, as described herein, can be implemented in a variety of ways, such as to include more or less sub-apertures 52 that can be overlapping or non-overlapping, symmetric or asymmetric, or in any other arrangement. Therefore, the two-way coded aperture radar imaging system 10 can be configured in any of a variety of ways.

Figure 3:
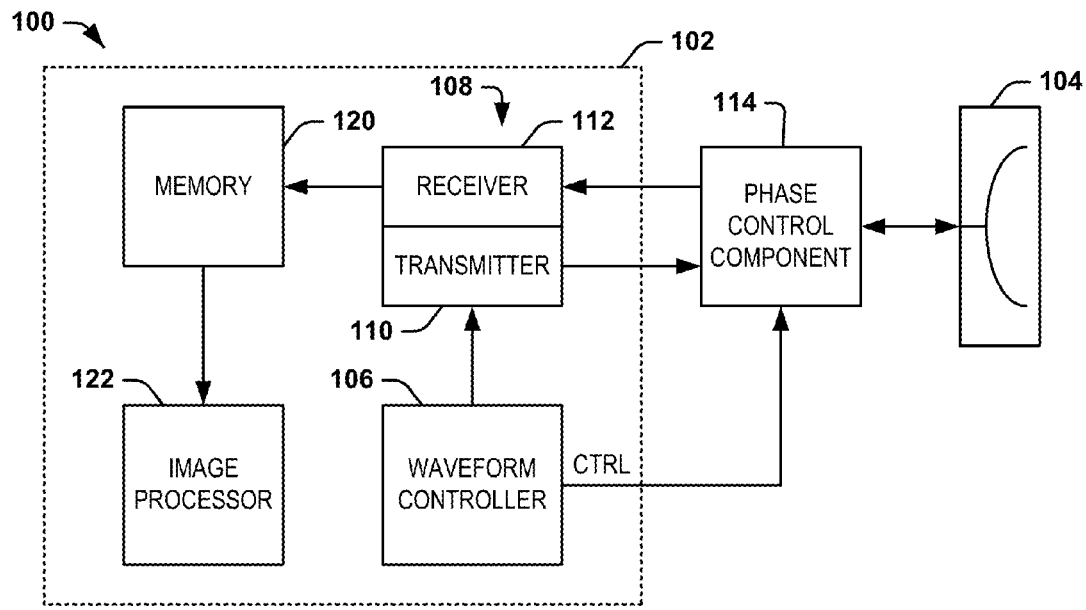
FIG. 3 illustrates another example of a two-way coded aperture radar imaging system.

FIG. 3 illustrates an example of a two-way coded aperture radar imaging system 100. The two-way coded aperture radar imaging system 100 can be implemented to generate images of a target, such as the target 12 in the example of FIG. 1. For example, the two-way coded aperture radar imaging system 100 can generate an image of a target to determine the presence of concealed weapons on the target, similar to as described above.

The two-way coded aperture radar imaging system 100 includes a sub-aperture radar controller 102 and a radar antenna 104 comprising a confocal reflector configuration, such as similar to the confocal radar antenna 18 in the example of FIG. 1. The radar controller 102 includes a waveform controller 106 configured to generate high-frequency sequential radar transmission signals, such as at terahertz frequencies. For example, the waveform controller 106 can generate the sequential radar transmission signals at a frequency that is sufficient to penetrate clothing. The sequential radar transmission signals are provided to a transceiver 108 that includes a transmitter 110 and a receiver 112. The transmitter 110 provides the sequential radar transmission signals to a phase control component 114 (e.g., a reflectarray).

The waveform controller 106 can also provide control signals CTRL to the phase control component 114. The control signals CTRL can be associated, for example, with predetermined phase-codes that can be selectively assigned to phase-shifters associated with the phase control component 114. As an example, the control signals CTRL can also provide the selective assignment information for assigning the phase-codes to sets of the phase-shifters of the phase control component 114, and thus assignment of the phase-shifters to specific sub-apertures of the radar antenna 104. Therefore, the phase control component 114 can provide the phase-encoding of the sequential radar transmission signals provided from the transmitter 110 to generate the phase-coded radar pulses that are transmitted from the phase control component 114 to the radar antenna 104.

Figure 4:
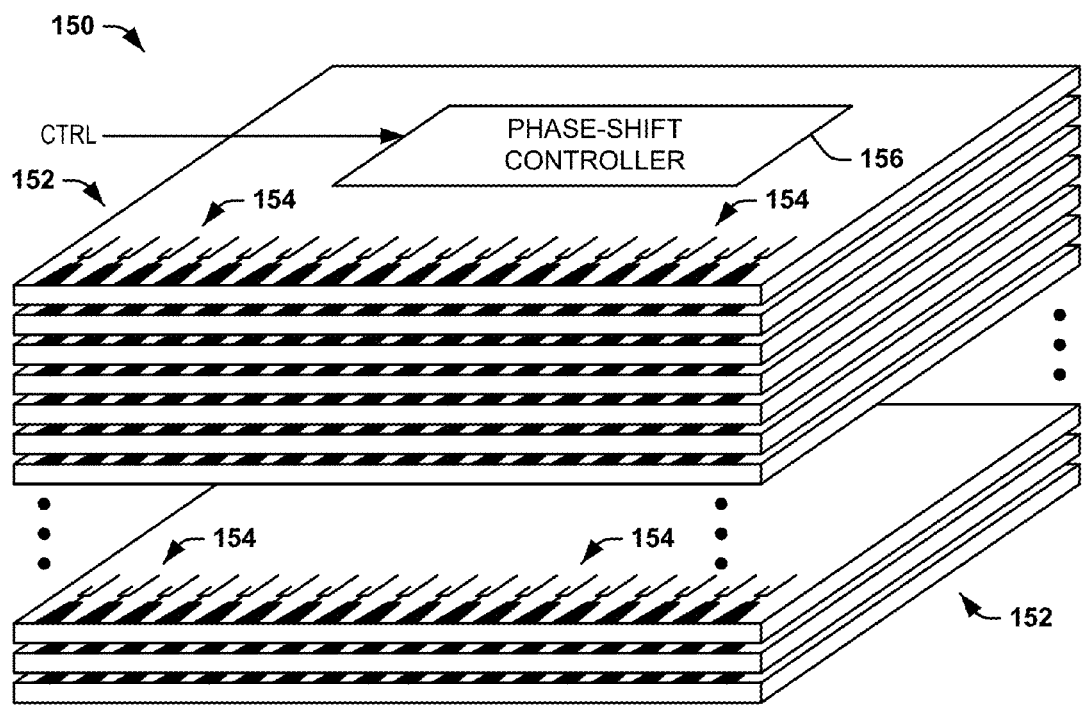
FIG. 4 illustrates an example of a reflectarray phase control component.

FIG. 4 illustrates an example of a reflectarray phase control component 150. The reflectarray 150 can be implemented as the phase control component on the radar antenna 104 in the example of FIG. 3. Therefore, reference is to be made to the examples of FIGS. 2 and 3 in the following description of the example of FIG. 4.

The reflectarray 150 includes a plurality of substrate layers 152 that each includes a plurality of phase-shifters 154. As an example, the reflectarray 150 can include any number of substrate layers 152 and phase-shifters 154 that can be equal or independent of each other to provide a phase-shift to each of the sequential radar transmission signals to generate the phase-coded radar pulses. In the example of FIG. 4, the reflectarray 150 also includes a phase-shift controller 156 that is demonstrated on the top substrate layer of the substrate layers 152. Thus, in the example of FIG. 4, the reflectarray 150 includes a single phase-shift controller 156 that controls all of the phase-shifters 154 on all of the substrate layers 152. It is to be understood, however, that the reflectarray 150 can include multiple phase-shift controllers 156. In the example of FIG. 4, the phase-shift controller 156 receives the control signal CTRL from the waveform controller 106. As an example, the waveform controller 106 can be communicatively coupled to the phase-shift controller 156 via a serial bus or other type of connector. The phase-shift controller 156 can thus assign the phase-codes corresponding to the respective sub-apertures 52 to the phase-shifters 154 based on the control signal CTRL that is provided by the waveform controller 106 to generate the phase-coded radar pulses that are transmitted from the reflectarray 150 via the respective phase-shifters 154 to the radar antenna 104. As an example, the phase-codes can be provided as ternary (e.g., tri-phase) pseudo-random number (e.g., m-sequence) code sequences, such that the phase-codes can be orthogonal with respect to each other.

The reflectarray 150 in the example of FIG. 4 has substantially fixed dimensions with respect to the relative position of each of the phase-shifters 154. However, despite the fixed dimensions of the reflectarray 150, by implementing a confocal reflector arrangement of the radar antenna 104, the radar antenna 104 can produce an effective coded aperture of an arbitrary size. In other words, the confocal reflector arrangement of the radar antenna 104 can allow the signal spot-centers to be magnified on the surface of the radar antenna 104, such as to provide overlapping of the phase-coded radar pulses transmitted from each of the phase-shifters 154.

Figure 5:
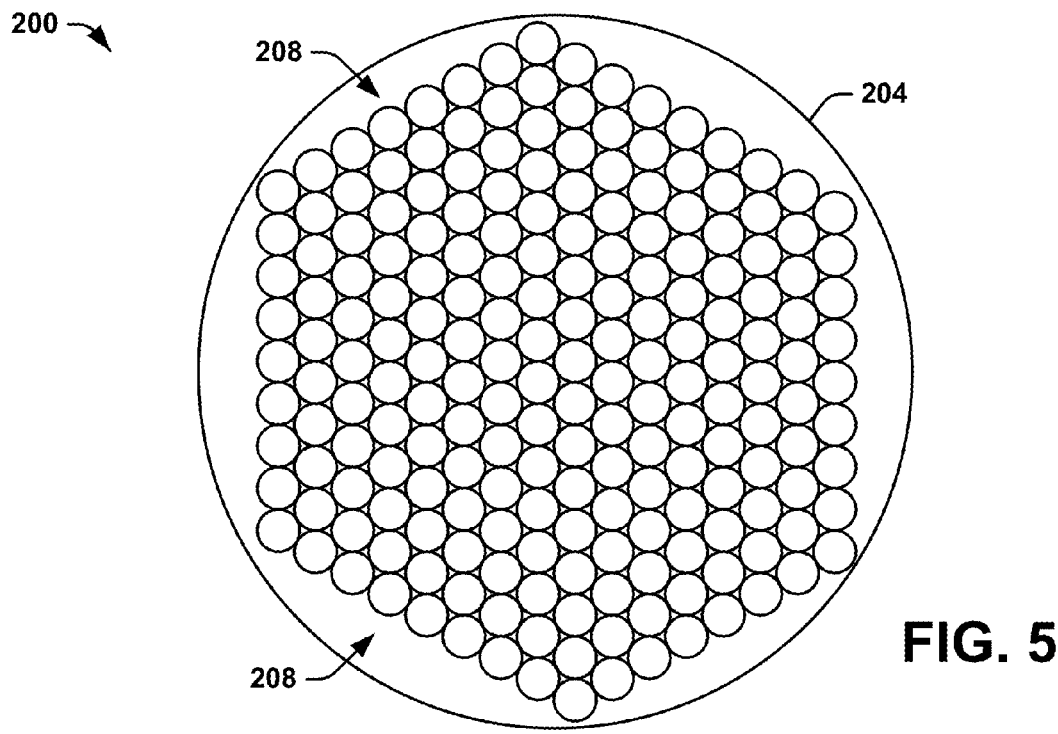
FIG. 5 illustrates another example of an antenna reflector.
Figure 6:
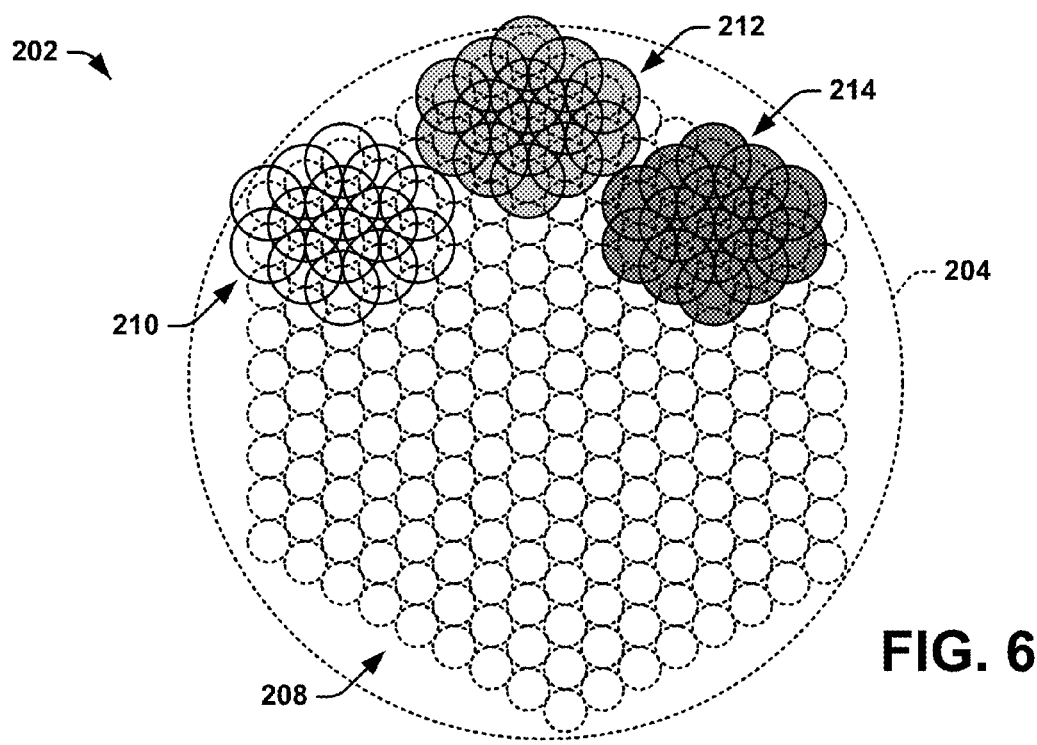
FIG. 6 illustrates yet another example of an antenna reflector

FIGS. 5 and 6 illustrate respective example diagrams 200 and 202 of an antenna reflector 204. The antenna reflector 204 can be a parabolic main reflector, and can thus correspond to the main antenna reflector 20 of the radar antennas 18 and 104 in the respective examples of FIGS. 1 and 3, and can correspond to the antenna reflector 50 in the example of FIG. 2. Therefore, reference is to be made to the example of FIGS. 1-3 in the following description of the examples of FIGS. 5 and 6.

In the example of FIG. 5, the antenna reflector 204 includes a plurality of spot-centers 208 that are each associated with a respective one of the phase-shifters 154 of the reflectarray 150. Thus, the arrangement of the phase-shifters 154 of the reflectarray 150 can provide a one-to-one mapping of the surface of the reflectarray 150 to the surface of the antenna reflector 204 with respect to physical locations of the reflection of the phase-coded radar pulses onto the antenna reflector 204. Therefore, a phase profile associated with the reflectarray 150 is replicated across the surface of the antenna reflector 204. The transmitted terahertz energy of the phase-coded radar pulses can be magnified in spatial extent to match a desired aperture size of the antenna reflector 204, yielding a desired cross-range resolution. For example, as described in greater detail herein, the phase-coded radar pulses transmitted from each of the phase-shifters 154 can overlap with the phase-coded radar pulses transmitted from adjacent phase-shifters 154. Additionally, the magnitude of the phase-shift can be preserved at each location of the spot-centers provided via the phase-shifters 154, such that a slope of a linear phase across the aperture of the antenna reflector 204 can be smaller by a factor of the magnification than that across the aperture of the reflectarray 150. Therefore, the scan angle off the antenna reflector 204 can be smaller by the same factor than that off of the reflectarray 150.

In the example of FIG. 6, a first proper sub-set of the spot-centers, and thus a first proper sub-set of the phase-shifters 154 of the reflectarray 150, are assigned a first phase-code to provide a first sub-aperture 210 on the surface of the antenna reflector 204. Similarly, a second proper sub-set of the spot-centers, are assigned a second phase-code to provide a second sub-aperture 212 on the surface of the antenna reflector 204, and a third proper sub-set of the spot-centers, are assigned a third phase-code to provide a third sub-aperture 214 on the surface of the antenna reflector 204. The first, second, and third phase-codes can be orthogonal with respect to each other. In the example of FIG. 6, the sub-apertures 210, 212, and 214 are demonstrated as solid-line overlapping spot patterns with different shading superimposed over the spot-centers 208 and the antenna reflector 204 in dashed lines for clarity. While the example of FIG. 6 demonstrates three sub-apertures 210, 212, and 214 that are transmitted from the antenna reflector 204, it is to be understood that the antenna reflector 204 can include more than three sub-apertures, each associated with a proper sub-set of the phase-shifters 154 that are assigned specific respective phase-codes, that are all transmitted and reflected concurrently.

Thus, the respective phase-shifters 154 to which a given one of the phase-codes is provided transmits a respective one of the phase-coded radar pulses which is replicated across that of the antenna reflector 204 according to the one-to-one spatial mapping of the phase-shifters 154 of the reflectarray 150 onto the antenna reflector 204. Thus, the phase-codes can be modulated onto each of the sequential radar transmission signals and can be demodulated from the reflected radar signals via the phase shifters 154 of the reflectarray 150. As an example, the size of the phase-coded radar pulses transmitted onto the antenna reflector 204 can be chosen to produce an illumination spot pattern that covers the FoR. For example, the illumination spot pattern size can be expressed as "λR/d", where "d" is the diameter of the sub-array image at the antenna reflector 204 and "R" is the range to the target 12.

In the example of FIG. 6, the phase-coded radar pulses are demonstrated as overlapping, such that the phase-coded radar pulse transmitted from a respective one of the phase-shifters 154 partially overlaps the phase-coded radar pulse transmitted from each respective adjacent one of the phase-shifters 154 (e.g., adjacent with respect to the same substrate layer 152 and adjacent substrate layers 152). Therefore, grating lobes associated with the phase-coded radar pulses can be substantially mitigated. In addition, the phase-codes and the assignments of the phase-codes to the phase-shifters 154 can change from one set of the sequential radar transmission signals to the next. For example, for a first set of sequential radar transmission signals, a given set of phase-codes can be assigned to respective predetermined sets of the phase-shifters 154 to provide a respective set of phase-coded radar pulses that are each associated with a given one of a respective set of sub-apertures, such as the sub-apertures 52, with each of the sub-apertures 52 being arranged substantially similar to the sub-aperture 210. For a second set of sequential radar transmission signals, a different set of phase-codes can be assigned to respective predetermined sets of the phase-shifters 154 to provide a respective set of phase-coded radar pulses that are each associated with a given one of a respective set of sub-apertures, with the sets of phase-shifters 154 being the same or different from the sets of phase-shifters 154 during the first set of sequential radar transmission pulses. Therefore, for each given set of sequential radar transmission pulses, the phase-codes can be the same phase-codes assigned to different sets of phase-shifters 154 (e.g., to provide sub-apertures 52 in different physical locations on the antenna reflector 50), can be different phase-codes assigned to the same sets of phase-shifters 154 (e.g., to provide sub-apertures 52 in the same physical locations on the antenna reflector 50, but with different phase-codes), or can be different phase-codes assigned to different sets of phase-shifters 154 (e.g., to provide sub-apertures 52 in the different physical locations on the antenna reflector 50 with different phase-codes).

Referring back to the example of FIG. 3, each of the phase-coded radar pulses, upon being reflected from the target 12, are received by the receiver 112 via the radar antenna 104 and the phase control component 114. The reflected signals are then buffered in a buffer memory 120. The radar controller 102 also includes an image processor 122. The image processor 122 is configured to integrate all of the reflected radar signals that correspond to a scan of the target to generate integration data. As an example, the image processor 122 can process the data corresponding to the reflected signals in the buffer memory 120 via a series of fast Fourier transforms (FFTs) to generate the integration data. The image processor 122 can thus generate an image of the target from integration data. The image can thus be displayed on a display (not shown) at the two-way coded aperture radar imaging system 100, or transmitted to another location for display.

For example, to recover the same phase-coded radar pulses via the reflected radar pulses, the phase-coded radar pulses can be transmitted as pulse bursts of very wide band LFM sub pulses with pulse-to-pulse linear frequency modulated (LFM) slope reversal in addition to the superimposed phase-code in order to eliminate a first longer range ambiguity. The pulse-to-pulse phase-coded radar pulses can be processed using stretch processing, for example, to achieve the required very high range resolution (e.g., approximately 1 inch) via the phase shifters 154 to superimpose mutually orthogonal phase sequences (e.g., one phase per phase-coded radar pulse) on the sequentially transmitted phase-coded radar pulses.

As an example, the LFM waveforms corresponding to the reflected radar signals are stretch-processed by the image processor 122 using the cyclic shifts of a ternary m-sequence $\{U_n\}$ of length $(3^6-1)=728$ to construct the phase $(\Phi(v)=(2*\pi/3)*U_n)$, which is superimposed on each LFM pulse in a string of sequential IPPs. Since all cyclic shifts of an m-sequence of length $(P^N-1$; where P is a prime number) can generate sequences in which the first N bits cover all integers 1 to $(P^N-1)$, a subset of $(2^N-1)$ sequences can be used for both transmission of the phase-coded radar pulses and the received reflected radar signals. Therefore, a given orthogonal phase-coding scheme can recover all of the same transmitted and received radar pulses uniquely. To recover all of the required 2-to-1 overlapped sub-apertures 52, separate sets of sequentially transmitted phase-coded radar pulse configurations can be implemented, similar to as described above based on the assignment of the phase-codes to the phase-shifters 154 in a variable manner, to reconfigure the phase-coded radar pulses, and thus the arrangement of the sub-apertures 52. Accordingly, extremely good cross correlation sidelobes and corresponding multiplicative noise ratio (MNR) can be achieved.

By implementing the orthogonal ternary (e.g., tri-phase) pseudo-random number (e.g., m-sequence) code sequences to generate the phase-coded radar pulses (e.g., via the reflectarray 150 in the example of FIG. 4), the two-way coded aperture radar imaging system 10 can enable simultaneous transmission and reception of the phase-coded radar pulses at close range with the target. The use of such orthogonal ternary (e.g., tri-phase) pseudo-random number (e.g., m-sequence) code sequences is thus advantageous over typical radar systems that implement other types of coding schemes, such as binary coding schemes. For example, in a typical radar system that implements a different phase coding (e.g., binary coding), the radar controller may not have a sufficient amount of time to switch a phase-code between transmit and receive for targets at a certain close range. Therefore, such a radar controller may not be able to distinguish the received reflected radar pulses based on the received reflected radar pulses cancelling the phase-code that was provided on transmit. In other words, because a binary code is either 0° or 180°, application of the binary code twice (e.g., on transmit and receive) results in 0° at all locations on the aperture. Therefore, a binary phase coding scheme in a typical radar implementation is unable to provide close range scanning of a target based on insufficient time to switch from a transmit code to a receive code. Accordingly, by implementing the orthogonal ternary (e.g., tri-phase) pseudo-random number (e.g., m-sequence) code sequences to generate the phase-coded radar pulses, the image processor 122 of the sub-aperture radar system 100 is able to differentiate transmitted codes from received codes even at close range.

It is to be understood that the two-way coded aperture radar imaging system 100 is not intended to be limited to the example of FIG. 3. As an example, the two-way coded aperture radar imaging system 100 is demonstrated very simplistically in the example of FIG. 3, such that a number of radar processing components have been omitted from FIG. 3 and the associated description. Thus, it is to be understood that additional radar control components can be included in the two-way coded aperture radar imaging system 100, such that the two-way coded aperture radar imaging system 100 can be configured in any of a variety of ways.

Figure 7:
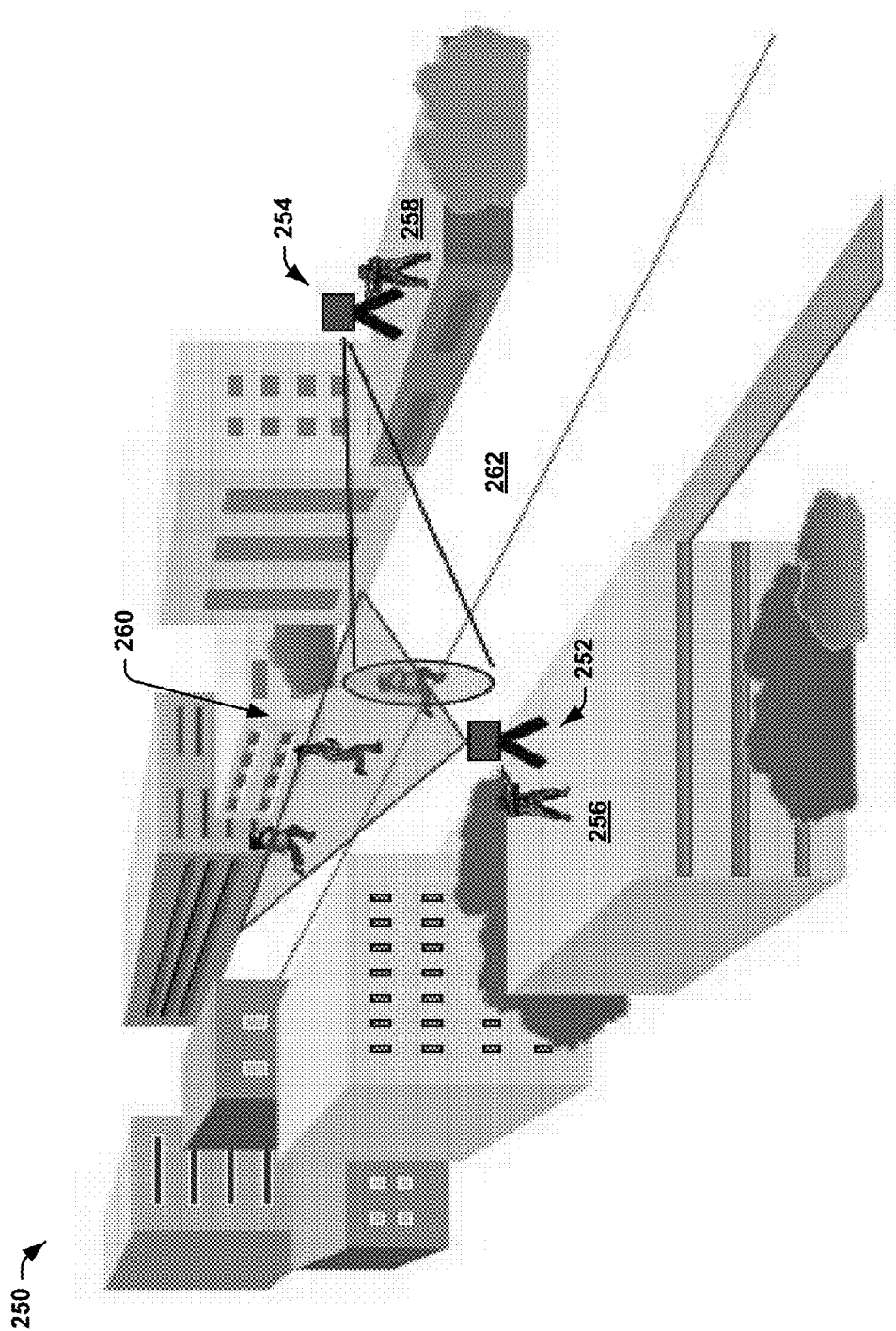
FIG. 7 illustrates an example of a schematic of a theater of operation of a two-way coded aperture radar imaging system.

FIG. 7 illustrates an example of a schematic 250 of a theater of operation of a two-way coded aperture radar imaging system. The schematic 250 demonstrates an urban scene that includes a first two-way coded aperture radar imaging system 252 and a second two-way coded aperture radar imaging system 254 that are configured in different locations in the theater of operation. In the example of FIG. 7, the first and second two-way coded aperture radar imaging systems 252 and 254 each operate from separate rooftops 256 and 258, respectively, to scan a plurality of targets 260 in a street 262 below.

In the example of FIG. 7, the targets 260 are demonstrated as people, such that the first and second two-way coded aperture radar imaging systems 252 and 254 can be implemented to scan the targets 260 at an ample resolution and from an adequate standoff distance to determine if they are carrying concealed weapons. Specifically, each of the first and second two-way coded aperture radar imaging systems 252 and 254 can be configured substantially similar to the two-way coded aperture radar imaging system 10 in the example of FIG. 1, such that the first and second two-way coded aperture radar imaging systems 252 and 254 can achieve very high resolution from sufficient standoff distances. As such, users of the first and second two-way coded aperture radar imaging systems 252 and 254 can easily aim the associated radar antennas at the targets 260 for rapid and high resolution scanning to determine whether the targets 260 carry concealed weapons from safe standoff distances. Furthermore, the theater of operations demonstrated in the schematic 250 is not limited to the use of two two-way coded aperture radar imaging systems 252 and 254, but could include a network of several two-way coded aperture radar imaging systems operating together to image targets for a determination of the presence of concealed weapons, such as in very densely crowded streets.

Figure 8:
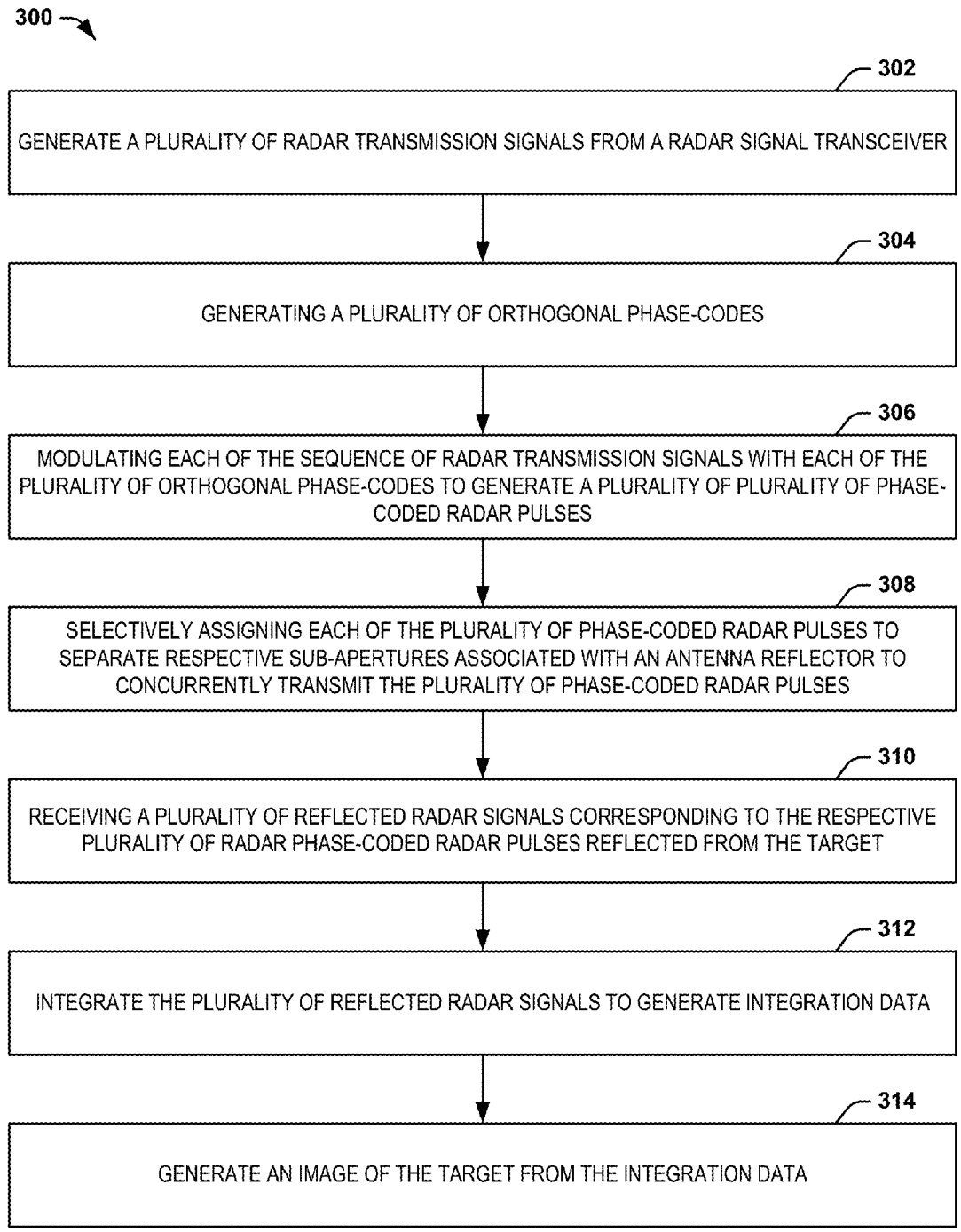
FIG. 8 illustrates an example of a method for imaging a target.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 300 for imaging a target (e.g., the target 12). At 302, a sequence of radar transmission signals is generated from a radar signal transceiver. At 304, a plurality of orthogonal phase-codes are generated (e.g., via the waveform controller 106). At 306, each of the sequence of radar transmission signals is modulated with each of the plurality of orthogonal phase-codes to generate a plurality of phase-coded radar pulses (e.g., the phase-coded radar pulses 24). At 308, each of the plurality of phase-coded radar pulses is selectively assigned to separate respective sub-apertures (e.g., the sub-apertures 52) associated with an antenna reflector (e.g., the antenna reflector 50) to concurrently transmit the plurality of phase-coded radar pulses. At 310, a plurality of reflected radar signals corresponding to the respective plurality of radar phase-coded radar pulses reflected from the target is received. At 312, the plurality of reflected radar signals are integrated to generate integration data (e.g., via the image processor 122). At 314, a three-dimensional image of the target is generated from the integration data.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A two-way coded aperture radar imaging system comprising:
    an antenna reflector comprising a confocal reflector configuration;
    a radar signal transceiver configured to generate sequential radar transmission signals and to receive a plurality of respective reflected radar signals;
    a phase control component configured to phase-encode the sequential radar transmission signals via a plurality of phase-codes to generate a respective plurality of phase-coded radar pulses that are concurrently reflected at a respective plurality of sub-aperture portions of the antenna reflector to concurrently transmit the plurality of phase-coded radar pulses from the antenna reflector to a target, the transmitted plurality of phase-coded radar pulses being reflected from the target as the respective plurality of reflected radar signals; and
    a sub-aperture radar controller configured to integrate the plurality of reflected radar signals and to generate a three-dimensional image of the target from the integrated plurality of reflected radar signals.

2. The system of claim 1, wherein the phase control component is configured as a reflectarray comprising an array of phase-shifters that are individually controlled to retransmit the plurality of phase-coded radar pulses based on the plurality of phase-codes, wherein the sub-aperture radar controller is configured to selectively assign the array of phase-shifters to correspond to the respective plurality of sub-apertures.

3. The system of claim 2, wherein each of the phase-shifters are associated with a corresponding one of the plurality of sub-apertures is configured to transmit a respective one of the plurality of phase-coded radar pulses in a manner that partially overlaps the respective transmitted one of the plurality of phase-coded radar pulses associated with at least one adjacent phase-shifter of the array of phase-shifters.

4. The system of claim 1, wherein the phase control component is configured to transmit the plurality of phase-coded radar pulses that are concurrently reflected at a first respective plurality of sub-aperture portions corresponding to respective first physical locations on the antenna reflector in each of a first plurality of the sequential radar transmission signals, and is further configured to transmit the plurality of phase-coded radar pulses that are concurrently reflected at a second respective plurality of sub-aperture portions corresponding to respective second physical locations on the antenna reflector in each of a second plurality of the sequential radar transmission signals, wherein the first and second physical locations at least partially overlap each other.

5. The system of claim 1, wherein the phase control component is configured to phase-encode the sequential radar transmission signals such that each of the plurality of phase-codes are orthogonal with respect to each other in each of the concurrently transmitted plurality of phase-coded radar pulses.

6. The system of claim 5, wherein the phase control component is further configured to generate each of the plurality of phase-codes as a respective distinct ternary pseudo-random number sequence.

7. The system of claim 5, wherein the phase control component is configured to phase-encode each of a first plurality of the sequential radar pulses via a first plurality of phase-codes to generate a respective first plurality of phase-coded radar pulses that are each transmitted in each of the first plurality of the sequential radar pulses, wherein each of the first plurality of phase-codes are orthogonal with respect to each other, wherein the phase control component is configured to phase-encode each of a second plurality of the sequential radar pulses via a second plurality of phase-codes to generate a respective second plurality of phase-coded radar pulses that are each transmitted in each of the second plurality of the sequential radar pulses, wherein each of the second plurality of phase-codes are orthogonal with respect to each other.

8. The system of claim 1, wherein the phase control component is configured as a reflectarray comprising an array of phase-shifters that are individually controlled to modulate each of the sequential radar transmission signals with a respective one of the plurality of phase-codes and to retransmit a respective one of the plurality of phase-coded radar pulses onto the separate respective plurality of sub-apertures of the antenna reflector.

9. The system of claim 8, wherein the array of phase-shifters comprises:
    a plurality of substrate layers that each comprise a row of the array of phase-shifters; and a phase-shift controller that provides the plurality of phase-codes to the array of phase-shifters in response to a control signal provided from the sub-aperture radar controller.

10. A security system for detecting concealed weapons on a person comprising the two-way coded aperture radar imaging system of claim 1.

11. A method for imaging a target, the method comprising:
generating a sequence of radar transmission signals from a radar signal transceiver;
generating a plurality of orthogonal phase-codes;
modulating each of the sequence of radar transmission signals with each of the plurality of orthogonal phase-codes to generate a plurality of phase-coded radar pulses;
selectively assigning each of the plurality of phase-coded radar pulses to separate respective sub-apertures associated with an antenna reflector comprising a confocal reflector configuration to concurrently transmit the plurality of phase-coded radar pulses;
receiving a plurality of reflected radar signals corresponding to the respective plurality of radar phase-coded radar pulses reflected from the target;
integrating the plurality of reflected radar signals to generate integration data; and
generating a three-dimensional image of the target from the integration data.

12. The method of claim 11, wherein modulating the sequence of radar transmission signals comprises selectively modulating each of the sequence of radar transmission signals with each of the plurality of phase-codes via a set of phase-shifters associated with a reflectarray, and wherein selectively assigning each of the plurality of phase-coded radar pulses comprises transmitting a respective one of the plurality of phase-coded radar pulses from the set of phase-shifters associated with a respective one of the plurality of sub-apertures.

13. The method of claim 11, wherein selectively assigning each of the plurality of phase-coded radar pulses to separate respective sub-apertures comprises:
assigning the plurality of phase-coded radar pulses to a first respective plurality of sub-apertures corresponding to respective first physical locations on the antenna reflector in each of a first plurality of the sequential radar transmission signals; and
assigning the plurality of phase-coded radar pulses to a second respective plurality of sub-apertures corresponding to respective second physical locations on the antenna reflector in each of a second plurality of the sequential radar transmission signals, wherein the first and second physical locations at least partially overlap each other.

14. The method of claim 11, wherein generating the plurality of phase-codes comprises generating each of the plurality of phase-codes as a respective distinct ternary pseudo-random number sequence.

15. The method of claim 11, wherein generating the plurality of phase-codes comprises:
generating a first plurality of phase-codes in each of a first plurality of the sequential radar transmission signals; and
generating a second plurality of phase-codes in each of a second plurality of the sequential radar transmission signals, wherein each of the second plurality of phase-codes are orthogonal with respect to each other.

16. A two-way coded aperture radar imaging system comprising:

an antenna reflector comprising a confocal reflector configuration;
a radar signal transceiver configured to generate sequential radar transmission signals and to receive a plurality of respective reflected radar signals;
a reflectarray comprising an array of phase-shifters configured to selectively phase-encode the sequential radar transmission signals via a plurality of phase-codes and to selectively transmit a respective plurality of phase-coded radar pulses that are concurrently reflected at a respective plurality of sub-aperture portions of the antenna reflector, the plurality of sub-apertures corresponding to a selective assignment of the array of phase-shifters, to concurrently transmit the plurality of phase-coded radar pulses from the antenna reflector to a target, the transmitted plurality of phase-coded radar pulses being reflected from the target as the respective plurality of reflected radar signals; and
a sub-aperture radar controller configured to selectively provide the plurality of phase-codes to the array of phase-shifters, to integrate the plurality of reflected radar signals, and to generate a three-dimensional image of the target from the integrated plurality of reflected radar signals.

17. The system of claim 16, wherein each of the phase-shifters are associated with a corresponding one of the plurality of sub-apertures is configured to transmit a respective one of the plurality of phase-coded radar pulses in a manner that partially overlaps the respective transmitted one of the plurality of phase-coded radar pulses associated with at least one adjacent phase-shifter of the array of phase-shifters.

18. The system of claim 16, wherein the phase control component is configured to transmit the plurality of phase-coded radar pulses that are concurrently reflected at a first respective plurality of sub-aperture portions corresponding to respective first physical locations on the antenna reflector in each of a first plurality of the sequential radar transmission signals, and is further configured to transmit the plurality of phase-coded radar pulses that are concurrently reflected at a second respective plurality of sub-aperture portions corresponding to respective second physical locations on the antenna reflector in each of a second plurality of the sequential radar transmission signals, wherein the first and second physical locations at least partially overlap each other.

19. The system of claim 16, wherein the phase control component is configured to phase-encode the sequential radar transmission signals via respective distinct ternary pseudo-random number sequences, such that each of the plurality of phase-codes are orthogonal with respect to each other in each of the concurrently transmitted plurality of phase-coded radar pulses and in each of the plurality of reflected radar signals.

20. The system of claim 19, wherein the phase control component is configured to phase-encode each of a first plurality of the sequential radar pulses via a first plurality of phase-codes to generate a respective first plurality of phase-coded radar pulses that are each transmitted in each of the first plurality of the sequential radar pulses, wherein each of the first plurality of phase-codes are orthogonal with respect to each other, wherein the phase control component is configured to phase-encode each of a second plurality of the sequential radar pulses via a second plurality of phase-codes to generate a respective second plurality of phase-coded radar pulses that are each transmitted in each of the second plurality of the sequential radar pulses, wherein each of the second plurality of phase-codes are orthogonal with respect to each other.

* * * * *